(12) United States Patent
Li et al.

(10) Patent No.: US 12,458,264 B2
(45) Date of Patent: Nov. 4, 2025

(54) COGNITIVE ASSESSMENT SYSTEM BASED ON EYE MOVEMENT

(71) Applicant: Ganzin Technology, Inc., Taipei (TW)

(72) Inventors: Kuei-An Li, New Taipei (TW);
Sung-En Chien, Taitung County (TW);
Chia-Yang Chang, Taipei (TW);
Shao-Yi Chien, Taipei (TW)

(73) Assignee: Ganzin Technology, Inc., Taipei (TW)

( * ) Notice: Subject to any disclaimer, the term of this patent is extended or adjusted under 35 U.S.C. 154(b) by 776 days.

(21) Appl. No.: 17/837,063

(22) Filed: Jun. 10, 2022

(65) Prior Publication Data

US 2022/0395206 A1    Dec. 15, 2022

Related U.S. Application Data

(60) Provisional application No. 63/209,406, filed on Jun. 11, 2021.

(51) Int. Cl.
  A61B 5/16    (2006.01)
  A61B 5/00    (2006.01)
  G16H 50/30   (2018.01)
  G16H 50/70   (2018.01)

(52) U.S. Cl.
  CPC ............ A61B 5/163 (2017.08); A61B 5/0022 (2013.01); A61B 5/7275 (2013.01); G16H 50/30 (2018.01); G16H 50/70 (2018.01)

(58) Field of Classification Search
  CPC ..... A61B 5/163; A61B 5/0022; A61B 5/7275; A61B 5/1114; A61B 5/168; A61B 5/4088; A61B 5/6814; G16H 50/30; G16H 50/70; G16H 50/20; G06V 40/18; G06Q 10/06393
  See application file for complete search history.

(56) References Cited

U.S. PATENT DOCUMENTS

| 1,090,536 | A  | 3/1914  | Houget |
| 8,475,391 | B2 | 7/2013  | Duffy |
| 10,694,942 | B2 | 6/2020  | Agichtein |
| 10,827,926 | B2 | 11/2020 | Blackwell |
| 10,895,909 | B2 | 1/2021  | Nijs |
| 11,219,403 | B2 | 1/2022  | Milner |

(Continued)

FOREIGN PATENT DOCUMENTS

| CN | 109044378 A | 12/2018 |
| CN | 110801237 A | 2/2020 |

(Continued)

Primary Examiner — Eric F Winakur
Assistant Examiner — Hy Khanh Doan
(74) Attorney, Agent, or Firm — Winston Hsu

(57) ABSTRACT

A cognitive assessment system includes a computing device, a server coupled to the computing device and an eye tracking device coupled to the computing device. The computing device includes a cognitive assessment program with at least one cognitive assessment task for assessing at least one cognitive function of a user. The server includes a database. The database stores a historical task performance data of the user, a historical task performance model of the user, task performance data of a healthy population, and task performance data of a patient population. The eye tracking device is for capturing the eye movement data of the user.

19 Claims, 12 Drawing Sheets

(56) References Cited

U.S. PATENT DOCUMENTS

2013/0090562 A1\* 4/2013 Ryan .................. G16H 50/30
                                                    600/473
2020/0405215 A1   12/2020 Tinjust
2021/0313020 A1\* 10/2021 Lee ..................... A61B 5/0022

FOREIGN PATENT DOCUMENTS

CN     111343927 A    6/2020
TW     201516892 A    5/2015

\* cited by examiner

COGNITIVE ASSESSMENT SYSTEM BASED ON EYE MOVEMENT

CROSS REFERENCE TO RELATED APPLICATIONS

This application claims the benefit of U.S. Provisional Application No. 63/209,406, filed on Jun. 11, 2021. The content of the application is incorporated herein by reference.

BACKGROUND OF THE INVENTION

1. Field of the Invention

The present invention is related to a cognitive assessment system, and more particularly to a cognitive assessment system based on eye movement.

2. Description of the Prior Art

The deterioration of cognitive ability with aging has gradually received attention. According to statistics, one out of every twelve elderly people over the age of 65 has dementia, and the number continues to grow. The proportion of the population with abnormal cognitive decline has increased rapidly, and with it comes the heavy burden of care on the society. Therefore, how to effectively detect the occurrence of abnormal cognitive decline and maintain the cognitive health of aging individuals is still the focus of many research efforts.

Cognitive assessment refers to assessing an individual's cognitive ability level through various methods and tools such as interviews, questionnaires, and tests. Traditional cognitive function assessments are mostly carried out in the form of interviews and pencil-and-paper questionnaires, such as Montreal Cognitive Assessment (MoCA) test and Mini-mental state examination (MMSE). The advantage of these tests is that they can get the results in a short time with certain amount of confidence. However, paper-and-pencil tests are not suitable for repeated testing in a short amount of time. The limitation makes the traditional paper-and-pencil test unsuitable for long-term continually assessment of changes in individual cognitive ability. In response to the above-mentioned limitations, more and more computer-based assessments have emerged. The advantage of computer-based assessment is that the execution of the test is not limited by time and space. Users can take cognitive function assessment through their own electronic devices, such as tablets, smartphones, and personal computers. They can take the assessment at home or in a laboratory setting. In addition, the computer-based assessments can be more flexible in terms of question types so that the result may be more accurate.

With the recent advancement of various sensing technologies, heart rate, respiration rate, electrodermal activity, and even EEG and eye movement can be easily measured. Among which eye movement is most suitable and widely discussed indicator for the assessment of cognitive function. It not only reflects the individual's direction of attention, but also provides dynamic data with high spatial and temporal resolution. Comparing with traditional assessment, it can more effectively measure the individual's behavioral decision-making process and provide a more accurate assessment of cognitive competency.

There are many eye movement based cognitive assessment products on the market today. However, these products are still in development stage with many limitations to be overcome. Especially the potential of assessment with eye tracking has not yet been fully realized. Most eye movement based cognitive assessment systems adopt a single task, which makes it difficult to distinguish changes in different cognitive functions. Furthermore, the existing eye movement based cognitive assessments mostly adopt norm comparison with patients or healthy population to detect abnormalities which depend on the score from a single assessment. It lacks the function of monitoring and predicting the individual's cognitive change over time.

SUMMARY OF THE INVENTION

The embodiment provides a cognitive assessment system including a computing device, a server coupled to the computing device and an eye tracking device coupled to the computing device. The computing device includes a cognitive assessment program with at least one cognitive assessment task for assessing at least one cognitive function of a user. The server includes a database. The database stores a historical task performance data of the user, a historical task performance model of the user, task performance data of a healthy population, and task performance data of a patient population. The eye tracking device is for capturing the eye movement data of the user. The computing device executes the at least one cognitive assessment task and generates task performance data of the user. The server receives the task performance data of the user from the computing device. The server compares the task performance data of the user and the historical task performance data of the user to the task performance data of the healthy population and the task performance data of the patient population to generate a comparison result. The server generates a risk value according the comparison result, and generates a cognitive function assessment report according to the risk value and the comparison result. The task performance data of the user comprises the eye movement data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
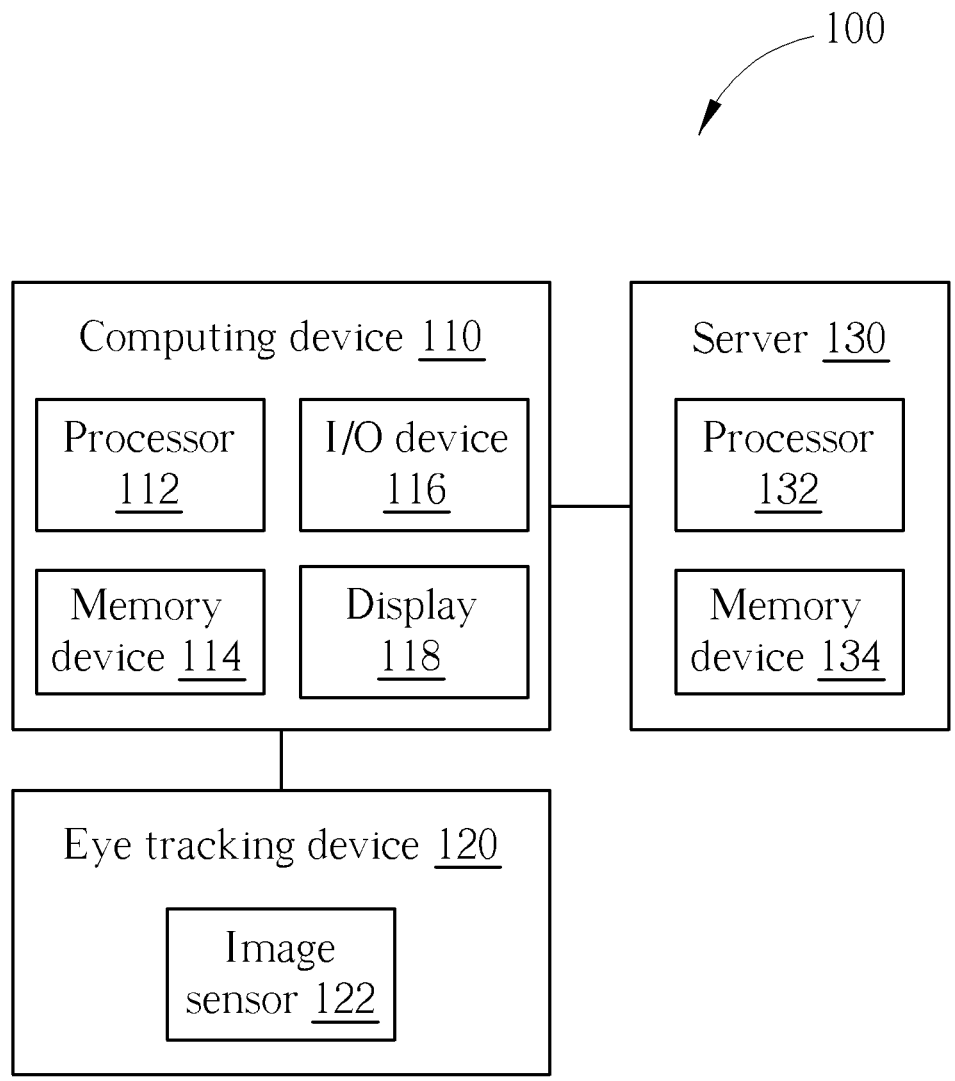
FIG. 1 is a block diagram of a cognitive assessment system of an embodiment of the present invention.

FIG. 1 is a block diagram of a cognitive assessment system 100 of an embodiment of the present invention. The cognitive assessment system 100 includes a server 130, an eye tracking device 120 and a computing device 110 coupled to the server 130 and the eye tracking device 120.

The computing device 110 comprises at least a processor 112, a memory device 114, an I/O (Input/Output) device 116 and a display 118. The I/O device 116 can be embedded in the computing device 110 such as a touchpad, a keyboard, a microphone, a camera, etc. Or, it can be an external device such as a mouse or a gamepad etc. The display 118 can be embedded in the computing device 110, or an external device such as a monitor and a projector. The memory device 114 in which at least a cognitive assessment program and related media materials are stored can be a RAM (Random Access Memory), a ROM (Read-Only Memory), a flash memory, a hard-drive, or any combination of the above-mentioned memory devices. The processor 112 is for executing the program stored in the memory device 114 based on the command received from a user or the server 130. The processor 112 may also execute functions such as computing the user's task performance data of the cognitive assessment task (referring to the task hereafter) based on the gaze-related information data, transferring the task performance data from the computing device 110 to the server 130, and responding to instructions of the server 130. The memory device 114 can also store an eye tracking program. In such embodiment, the processor 112 can be further configured to receive the image data from the eye tracking device 120 and computing the gaze-related information data of the user according to the image data received and the eye tracking program stored in the memory device 114. The gaze-related information data includes gaze position, pupil size, eye movement event classification (e.g., fixation, saccade, blink, etc.). The computing device 110 can be a smartphone, a tablet, a laptop, a computer, an extended reality (e.g., AR, VR and MR) device and/or smart glasses.

The eye tracking device 120 includes an image sensor for capturing images of a user's face or eyes. The image sensor can be a webcam, infrared camera or any other sensors that can capture images. The eye tracking device 120 can be an external device or embedded in the computing device 110. In an embodiment, the eye tracking device 120 further includes a standalone processor which receives the images captured by the eye sensor and computes the gaze-related information data of the user. The standalone processor may be implemented as a small-size low-power application-specific integrated circuit (ASIC), a digital signal processor (DSP), or a field programmable gate array (FPGA). In such embodiment, the eye tracking device 120 sends the gaze-related information data to the computing device 110. In other embodiment, the images captured by the eye sensor would be sent to and processed by the computing device 110. In some embodiments, the eye tracking device 120 can further include a light emitting device facing the user to brighten the face and/or the eyes of the user, facilitating the image capturing. The eye tracking device 120 can be either a remote eye tracker or a wearable eye tracker such as the eye tracking device embedded in a wearable device (e.g., extended reality device, smart glasses), a glass type eye tracker or eye tracking device embedded on the user's glasses. The eye tracking device 120 can be connected with the computing device 110 through a wired network, a wireless network (e.g., WIFI or Bluetooth) and/or universal serial bus (USB).

In an embodiment where the eye tracking device 120 is a wearable eye tracker, the eye tracking device 120 can further comprise an image sensor 122 for capturing the image of the user's view. The image sensor 122 can be a standalone image sensor, or the image sensor embedded in the computing device. The gaze position is represented by user-centered coordinates (e.g., the coordinate system defined by the image sensor or the embedded display of the wearable device) in which origin would move with the head movement. In order to get a more precise analysis of the gaze-related information data of the user, it is necessary to record the head movement of the user and transform the information from a user-centered coordinate into the world coordinate. To record the head movement, in some embodiments, the current system can further comprise a set of machine-readable markers which can be a digital signal presented on the display of the computing device or a physical object set in the environment. Such machine-readable markers can be a geometric figure, word, symbol, specific color, color gradient or light signal with specific intensity and/or wavelength. The image sensor 122 of the eye tracking device 120 can capture the image of the user's view which includes a machine readable marker. The computing device 110 or the eye tracking device 120 can compute the head movement based on the displacement of the marker in consecutive image frames captured by the image sensor 122. In another embodiment, the system can further include a gyroscope and/or an accelerometer for recording the head movement of the user. Once the head movement is recorded, the computing device 110 or the eye tracking device 120 can transform the coordinates of the gaze-related information data from user-centered coordinates into the world coordinates based on the head movement.

The server 130 can be a cloud server that connects with the computing device 110 through wired network or wireless network. The server 130 includes at least a processor 132 and a memory device 134. The memory device 134 stores historical data of the individual taking the assessment (i.e., the user), the cognitive assessment data of healthy population, and the cognitive assessment data of population suffered from a specific disease.

The data collected from the users, the health population, and the patient population includes both the absolute and the relative (i.e., the difference between the current performance and the task performance from the first assessment) task performance of the cognitive assessment. By using machine learning, such above-mentioned data can be used to form a model to estimate the probability that the user be categorizing as a specific group (e.g., healthy population or population with a specific disease) and the risk that the individual will develop a specific disease in the future. The model is based on an individual's task performance in a single cognitive assessment and the pattern of relative task performance across several cognitive assessments.

Figure 2A:
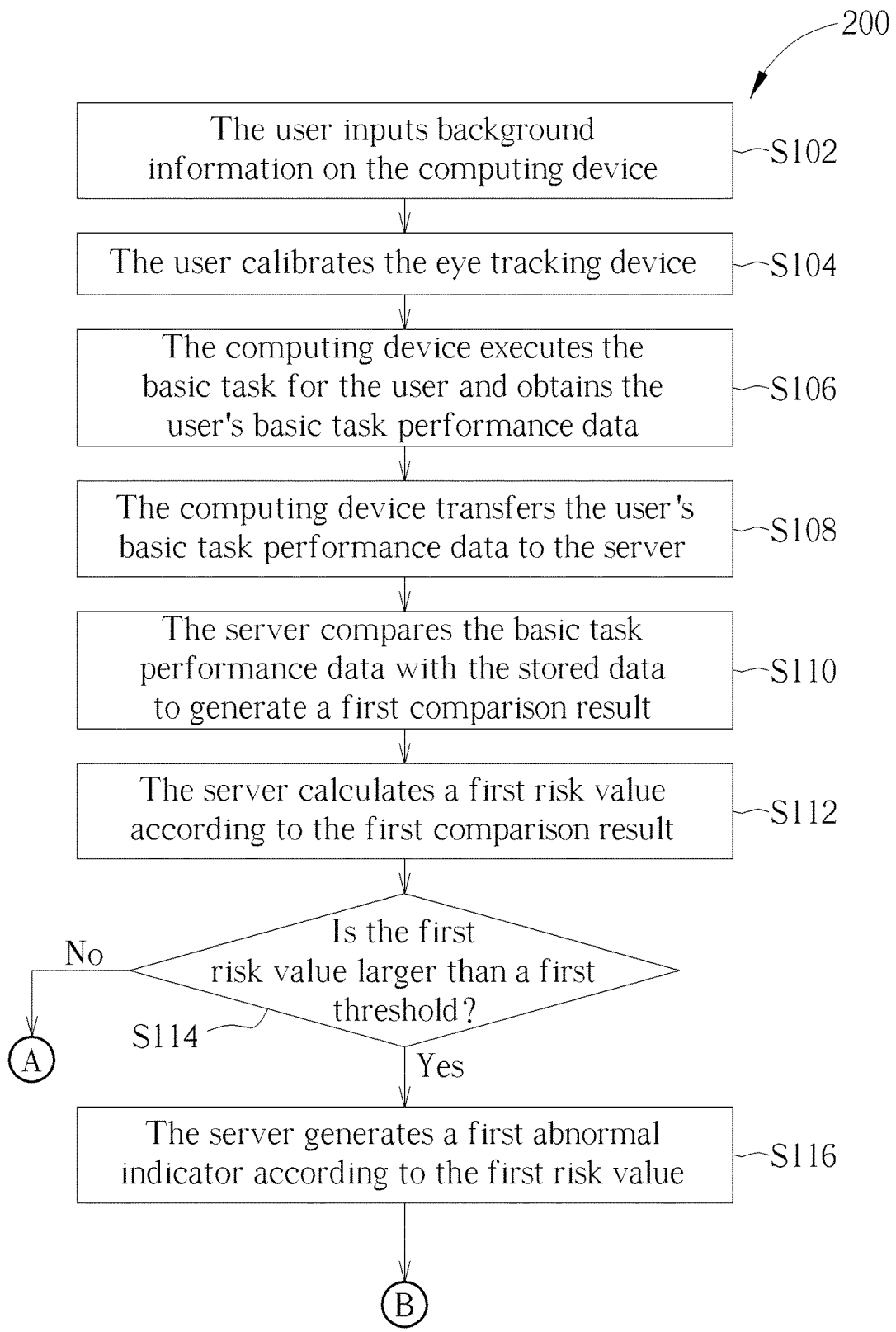
FIG. 2A and FIG. 2B are flowcharts of a method of the procedure of the cognitive assessment program in an embodiment.
Figure 2B:
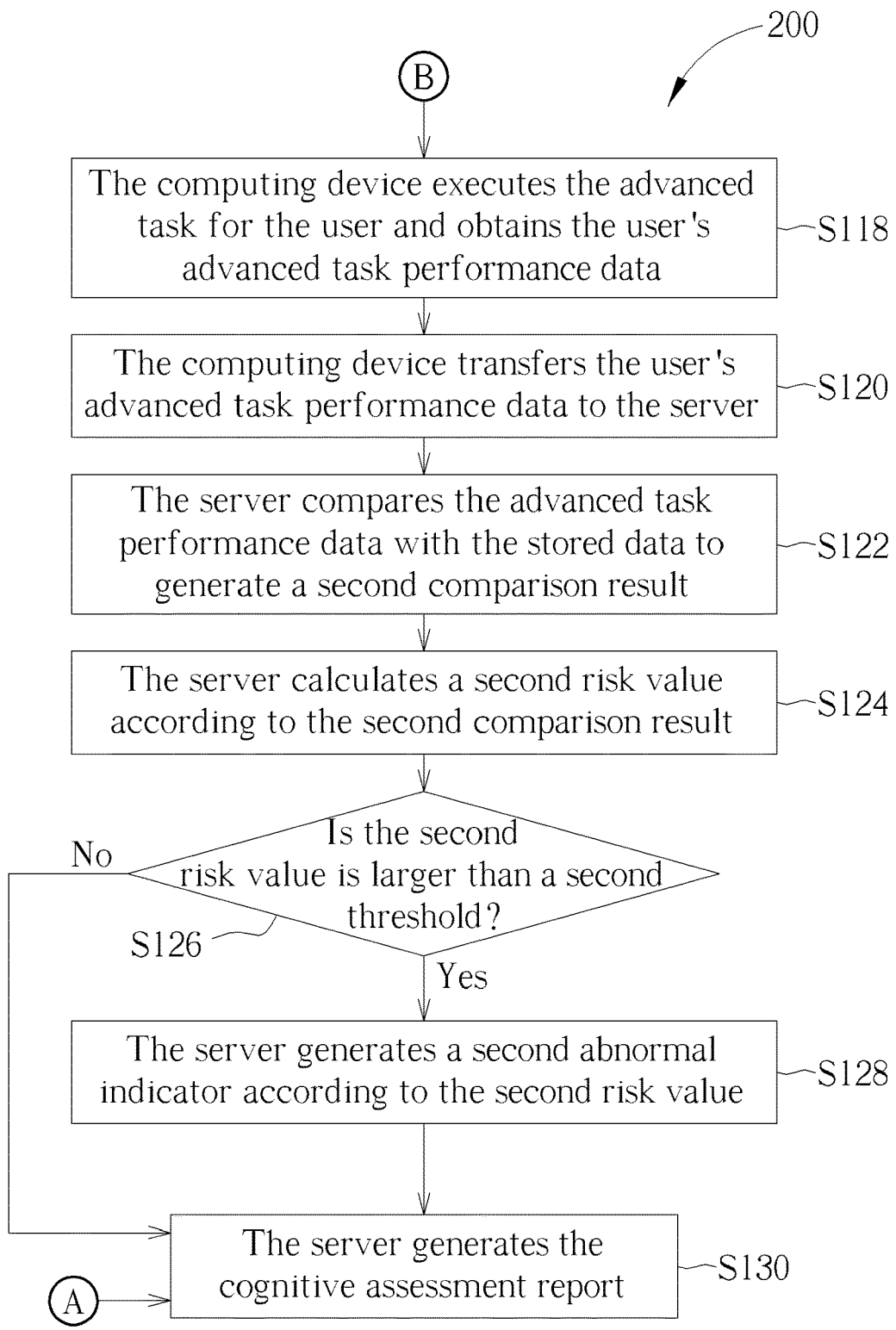

FIGS. 2A and 2B are flowcharts of a method 200 of the procedure of the cognitive assessment program in an embodiment. The method 200 includes the following steps:

S102: The user inputs background information on the computing device 110;

S104: The user calibrates the eye tracking device 120;

S106: The computing device 110 executes the basic task for the user and obtains the user's basic task performance data;

S108: The computing device 110 transfers the user's basic task performance data to the server 130;

S110: The server 130 compares the basic task performance data with the stored data to generate a first comparison result;

S112: The server 130 calculates a first risk value according to the first comparison result;

S114: The server 130 determines whether the first risk value is larger than a first threshold; if yes, proceed to step S116; if not, proceed to step S130;

S116: The server 130 generates a first abnormal indicator according to the first risk value;

S118: The computing device 110 executes the advanced task for the user and obtains the user's advanced task performance data;

S120: The computing device 110 transfers the user's advanced task performance data to the server 130;

S122: The server 130 compares the advanced task performance data with the stored data to generate a second comparison result;

S124: The server calculates a second risk value according to the second comparison result;

S126: The server 130 determines whether the second risk value is larger than a second threshold; if yes, proceed to step S128; if not, proceed to step S130;

S128: The server 130 generates a second abnormal indicator according to the second risk value;

S130: The server 130 generates the cognitive assessment report.

In step S102, the user can input the background information by the I/O device 116. The background information may include name, gender, age, education background, native language, etc. In another embodiment, the background information can further include the fingerprint and/or face identity of the user. In such cases, the computing device 110 can automatically load the stored user information when recognizing the fingerprint and/or the face identity of the user. The background information can be stored in the computing device 110 or be transferred and stored in the server 130.

After the computing device 110 receives the background information, in the step S104, the user follows the instruction from the computing device 110 to complete the calibration of the eye tracking device 120. The calibration procedure includes at least three steps. In the first step, the computing device 110 instructs the user to confirm the position of the eye tracking device 120. The user can move the eye tracking device 120 to the correct position according to graphical or voice instructions. This step can be performed automatically after initial power up of the eye tracking device 120. If the eye tracking device 120 is properly positioned, the computing device 110 will continue with the second step. In the second step, the user looks at a single or multiple fixation points. The fixation point could be a virtual object presented on the screen or paper. Visual and/or audio feedbacks will be provided after detecting user looking at the fixation point. In another embodiment, the second step can also be performed in form of an interactive game. In the third step, the computing device 110 will present the calibration result of calibration for the user to evaluate the performance of the eye tracking device 120. The user can determine whether the quality of the received gaze-related information data is adequate. The calibration result can be an average score for all fixation points viewed in the calibration procedure or a score for each fixation point viewed in the calibration procedure. The above-mentioned score can be an abstract value based on the accuracy and/or confidence computed by the eye tracking algorithm (e.g., the numerical distance between the received gaze position and the specific fixation points). The calibration result can be shown in the form of a visual message and/or an audio message. If the calibration result is unsatisfactory, the second step can be repeated to recalibrate the eye tracking device 120. In an embodiment, if the eye tracking device 120 had been calibrated before, the computing device 110 can automatically load the existing calibration data based on the user's background information. After the calibration of the eye tracking device 120, in step 106, the computing device 110 automatically executes the basic task. The following paragraphs will describe exemplary tasks adopted in the method 200. These tasks can either be implemented as the basic task or as the advanced task according to the application.

Figure 3A:
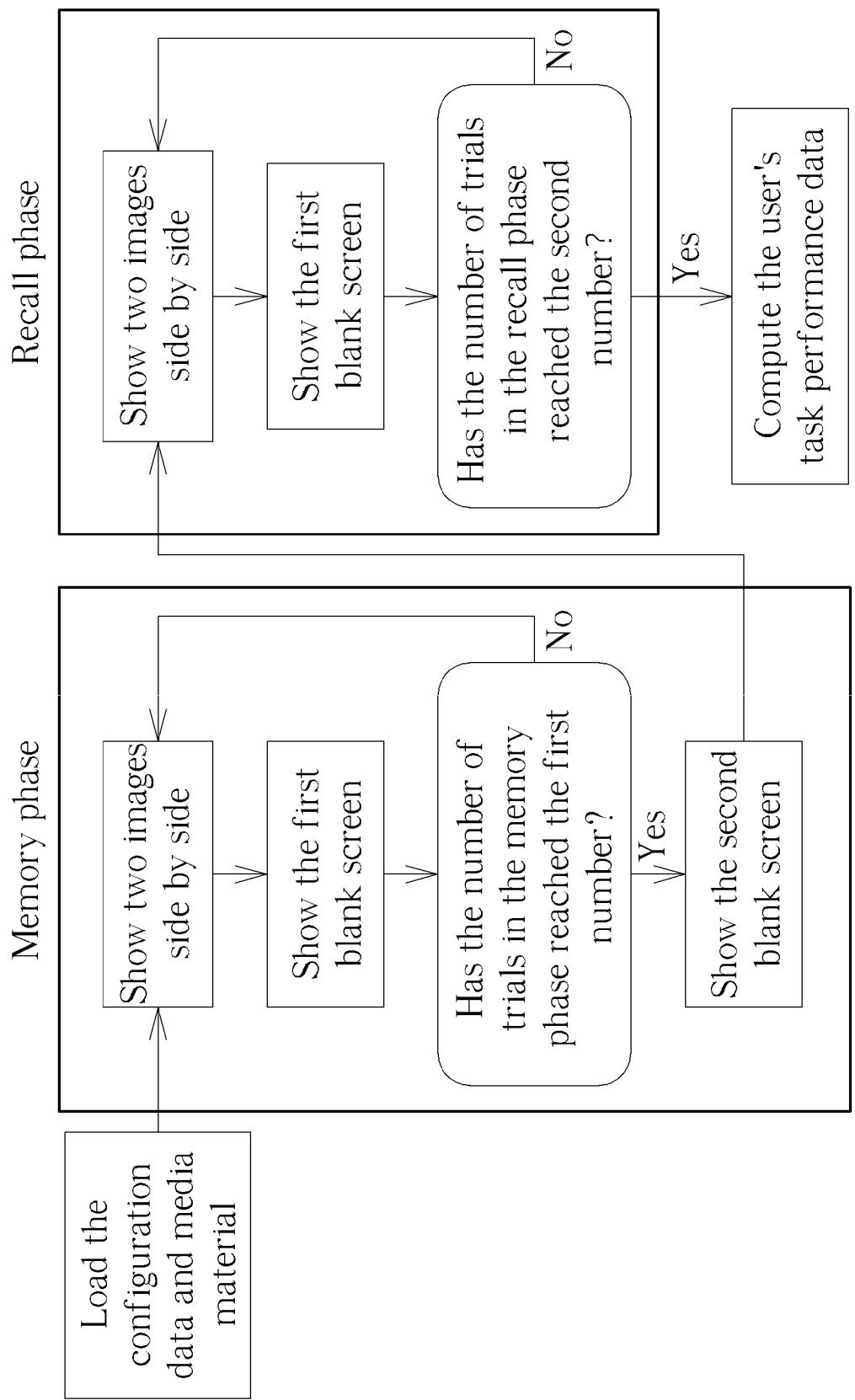
FIG. 3A and FIG. 3B are diagrams of the procedure of the simple image memory task and a corresponding example of the simple memory task.
Figure 3B:
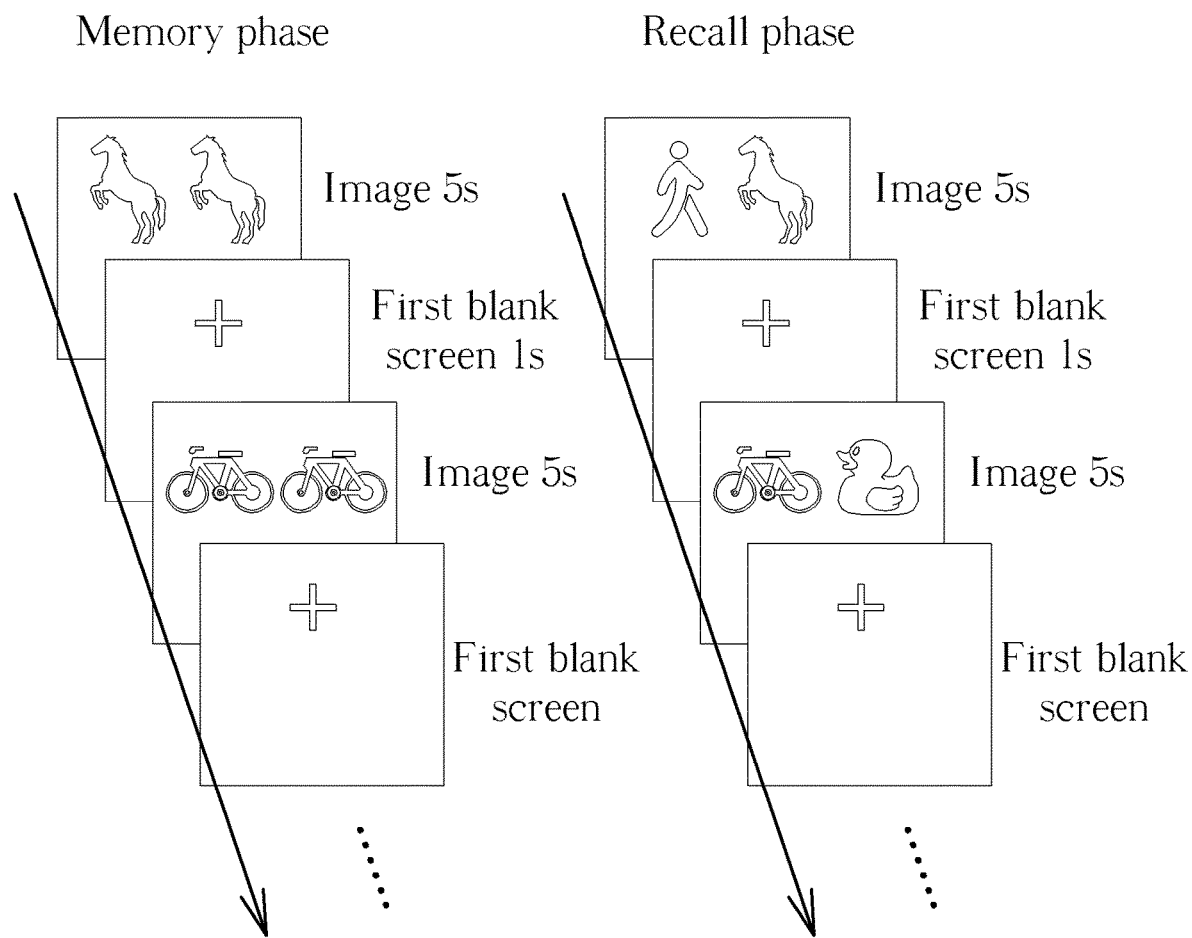

FIGS. 3A and 3B are diagrams of the procedure of the simple image memory task and a corresponding example of the simple memory task. The memory task is divided into two phases: (1) the memory phase and (2) the recall phase. Before the execution of the task, the computing device can preload the configuration data and the media materials of the task. The configuration data includes three types of temporal information regarding the presentation of the images: (1) the first time period referring to the time each image being presented on the display; (2) the second time period referring to the time between the presentation of two consecutive images; (3) the third time period referring to the time between the memory phase and the recall phase. The configuration data also includes: (1) a first number referring to the predefined number of trials in the memory phase; (2) a second number referring to the predefined number of trials in the recall phase; and (3) the order of trails executed in the task. In the simple image memory task, each trial refers to the presentation of a specific pair of two images. In each pair, the two images can be identical or different from each other. The media materials include a first gallery and a second gallery respectively for the memory phase and the recall phase.

In the memory phase, the computing device 110 randomly selects images from the first gallery. Each selected image forms a trial and would be presented to the user for the first time period (e.g., 5 s). A first blank screen of a second time period (e.g., 1 s) follows each presentation of the image. After each first blank screen, the computing device 110 determines whether the number of trials executed in the memory phase has reached the first number. If the first number has been reached, the computing device 110 can end the image presentation and a second blank screen of a third time period (e.g., 1 s) follows. Otherwise, the computing device 110 can continue to present the images.

After the second blank screen, the computing device 110 executes the recall phase. The procedure of the recall phase is similar to the memory phase except that during each image presentation (i.e., trial), two different images are presented side by side. One is the image presented to the user in the memory phase (i.e., the repeated image) and the other one is an image randomly selected from the second gallery (i.e., the novel image), which has not been shown in the memory phase. Then, the user is asked to fixate on the novel image. Similar to the memory phase, at the end of each first blank screen, the computing device 110 determines whether the number of trials in the recall phase has reached the second number. If so, the computing device 110 can end the task and calculate the task performance. The task performance data is calculated based on the combination of the task information data and the user's gaze-related information data. The task information data includes the timestamp of the image appeared and disappeared during the presentation, and the positions of images in the memory phase and the recall phase.

The task performance can be determined with the following task performance data in the recall phase: (1) the proportion of time that user fixated on the repeated images and novel images respectively; (2) the difference between the proportion of time that the user fixated on the repeated images and the novel images; (3) the number of fixations located at the repeated images and novel images respectively; (4) the number of saccade eye movement shifting between the repeated images and novel images; (5) the number of saccade eye movement shifting within the repeated images and novel images respectively; (6) the latency between the onset of image presentation and the first fixation landing on the repeated images; and (7) the latency between the onset of image presentation and the first fixation landing on the novel images. Further detailed evaluations could be done by analyzing the above-mentioned task performance data based on the time periods between a given image presented in the memory phase and the recall phase. This may include a trend analysis of different task performance data and/or the comparison result of these task performance data between groups divided by a given threshold of time between the onset time of a specific image in the memory phase and the recall phase.

For example, for a given image, the time between the image presented in the memory phase and the same image presented in the recall phase may be from 10 s to 180 s. With increasing time, the time proportion user fixating on the novel image would decrease, and the time proportion difference between the user fixating on the repeated images and the novel images would decrease. Such phenomena may suggest that it becomes more difficult for the user to keep the image in his memory as the time increases. Individuals with impaired memory can be revealed by having worse task performance with longer time.

Besides the above-mentioned fixation related parameters, the user's performance can also be determined by other parameters such as saccade eye movements and the pupil size. In another embodiment, the task may increase complexity to assess multiple cognitive abilities of the user.

Figure 4A:
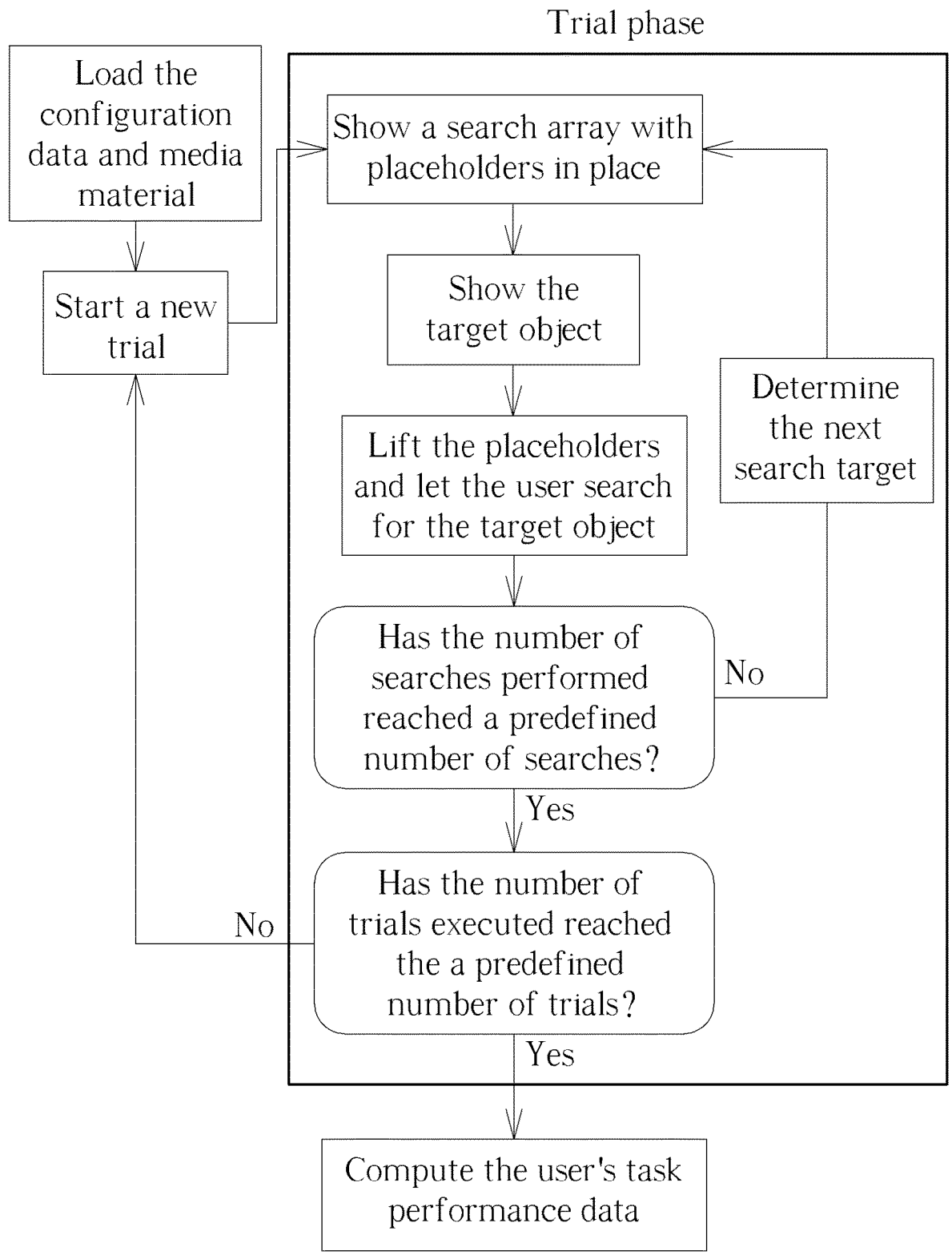
FIG. 4A and FIG. 4B are diagrams of the procedure and a corresponding example of a visual search task of an embodiment.
Figure 4B:
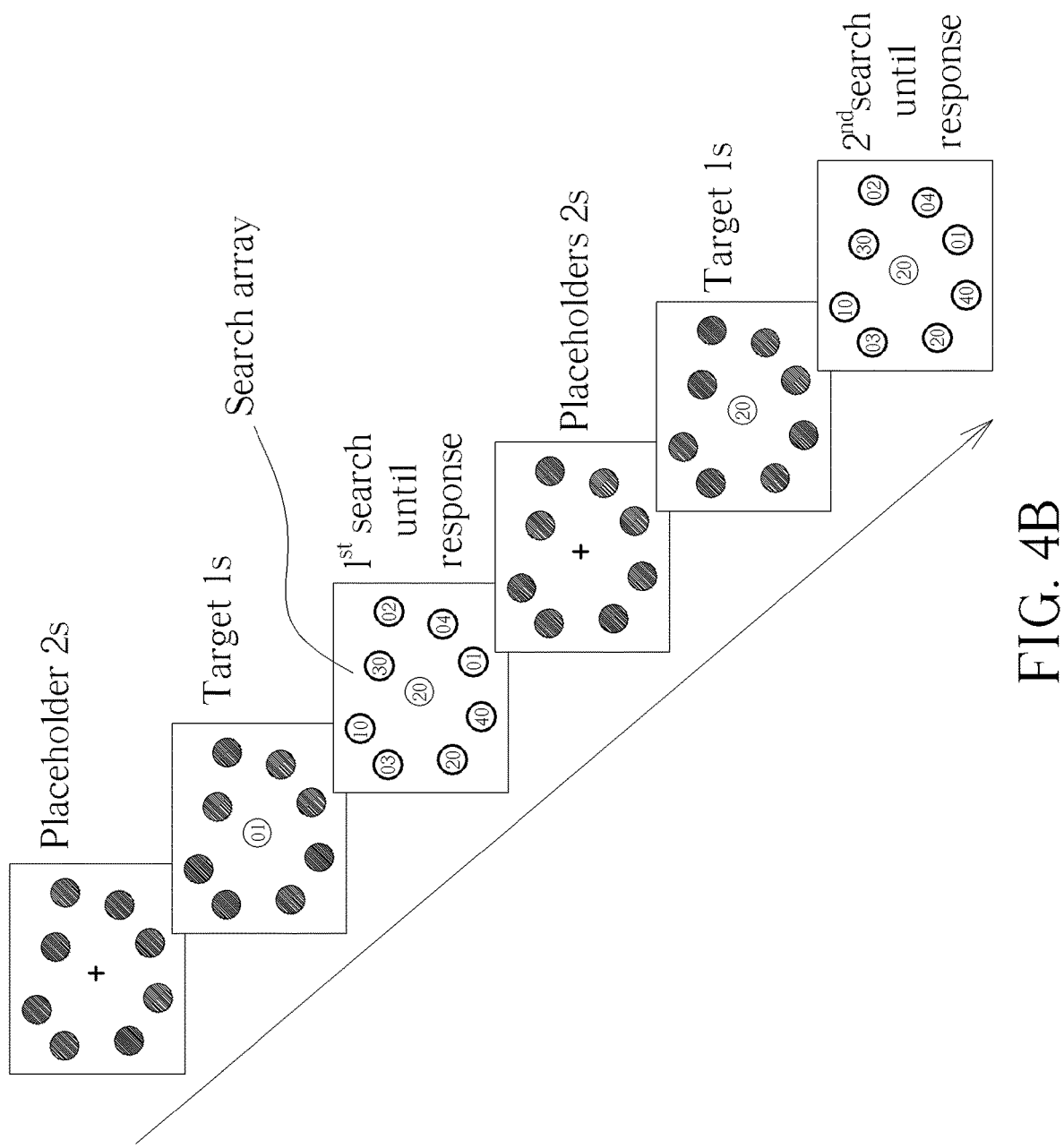

FIGS. 4A and 4B are diagrams of the procedure and a corresponding example of a visual search task. Before the execution of the task, the computing device 110 can preload the configuration data and the media materials of the task. The configuration data includes the time spent in each step in the task, the number of searches in a single trial (e.g., two searches per trial), and the number of objects shown in each trial, and the total number of trials.

The first search target and the search array of each trial are generated by the system randomly. The objects in the search array can be patterns, numbers, or graphical information. When entering the trial phase, a trial begins with placeholders blocking the objects in the search array for a first time period of 1 s. The placeholders are for informing the user the positions where the objects are (including target object and non-target objects). After the first time period, the target indicator is shown on the screen with the placeholders still in place. Then, the placeholder will be lifted for a second time period of 1 s. The first time period can be longer than the second time period. After the second time period, the user is asked to search and fixate on the target from the objects as quickly as possible. The user's response of target searching, regardless hitting or missing the target object, is sent to the computing device 110. After each search, the computing device 110 can determine whether the number of searches performed in the current trial has reached a predefined number. If not, the above trial would be repeated, and the computing device 110 can determine the next search target according to the gaze-related information data gathered in the current search. For example, if the search array includes ten target objects and only three target objects are correctly fixated by the user, the next search target objects can be selected from the three targets correctly fixated.

When the number of trials executed has reached the predefined total number of trials, the computing device 110 can compute the task performance data according to gaze-related information data and the task information data (e.g., the position of each object and the timestamp of the searches).

Followings are examples of the task performance data calculated in the repeated visual search task and be used to estimate various cognitive abilities: (1) the time to fixate the non-target objects; (2) the number of fixations before fixating the non-target objects; (3) the number of fixations on the non-target objects; (4) the fixation time on the non-target objects; (5) the time to fixate the target object; (6) the number of fixations before fixating the target object; (7) the number of fixations on the target object; (8) the fixation time on the target object; and (9) the number of re-fixations to the target indicator. The task performance data can be used to estimate the executing function of the user. The difference between the consecutive searches can be used to estimate the memory function of the user. To increase the sensitivity of the task performance data, the objects can also be changed to make the repeated visual search task more difficult (e.g., more objects and/or higher similarity between the search objects). In addition, the concept of the conjunction search can also be adopted in objects selection. Furthermore, the repeated visual search task can also be used to estimate the semantic-related function if the objects used include semantic relationship. Finally, the repeated visual search task can be implemented in a way with higher ecological validity. That is, the search array may be more than a group of abstract objects. The repeated visual search task can ask the user to search an object in a scenario such as finding clothes in a closet, or finding a specific book in a room. The search can be done with 2D or 3D images or even in an extended reality setting.

In step S108, the computing device 110 transfers the user's basic task performance data to the server 130. In step S110, the server 130 compares the basic task performance data with the basic task performance data of a population in the database to generate the first comparison result. In step S112, the server 130 calculates a first risk value according to the first comparison result. In an embodiment, to calculate the first risk value, the server 130 first selects a population in the database that corresponds to the user's background information (e.g., age, gender, education background), and compares the user's basic task performance data to a set of data. The set of data includes the historical task performance data of the user, the task performance data of a healthy population and/or a patient population (e.g., subjective cognitive decline, mild cognitive impairment, Alzheimer's disease and other types of disease involved cognitive impairment). In addition, the task performance includes the distribution of the absolute and the relative task performance of the population, and an individual's trend and pattern of relative task performance across several cognitive assessments with which a historical task performance model can be constructed. The first comparison result can include the user's rank in a given population, and the probability of the user belonging to the population.

The historical task performance model (e.g., a latent growth model), which is configured to estimate the change of cognitive function across a period of time, is generated based on the relative task performance data across several cognitive assessments. The historical task performance model can be generated for the user, the healthy population and/or the patient population. The probability of the user belonging to the health population or the patient population can be calculated based on the goodness-of-fit between the relative task performance of the user and the historical task performance model of healthy population and/or the patient population. Goodness-of-fit may be implemented in the forms of probability, root mean square error (RMSE), or any other statistic method that can describe the discrepancy between the observed data and the historical task performance model. In other embodiment, the task performance can further include an individual's trend and pattern of absolute task performance across several cognitive assessments and the historical task performance model can also be generated based on these trend and pattern of absolute task performance.

To calculate the first risk value, the server 130 further includes a discrimination model based on the first comparison results that can discriminate the user with a certain level of cognitive impairment from the healthy population. In such a case, the risk value can be estimated from the numerical distance between the user's task performance data and the threshold value defined by the discrimination model. Specifically, the discrimination model may estimate the performance of the user as a position in a geometric space. Each parameter in the first comparison results (e.g., the user's rank in each population, and the discrepancy between the user's data and the historical task performance model of each population) can construct a dimension of the space. In some cases, the number of dimensions of the space can be further reduced by merging the parameters based on the relationships between these parameters. The threshold value can be a point, a line, or a plane in the space according to the number of dimensions of the space. The numerical distance between the user's task performance data and the threshold value can be calculated as the Euclidean distance. A cumulative distribution function can be used to estimate the risk value. In such a function, the x axis is the Euclidean distance and the y axis is the probability of categorizing a user as a given population. The estimated risk value corresponds to the probability at a given numerical distance. In other embodiment, the server 130 can form the discrimination model based on the basic task performance data. However, the methods of calculation can also be included. The invention is not limited thereto.

In step S114, the server 130 determines whether the first risk value of the user is larger than a first threshold. When the first risk value is larger than the first threshold, the server 130 generates the first abnormal indicator and the computing device 110 executes the advanced task. Otherwise, the cognitive assessment system 100 would generate the user's cognitive assessment report. If the user has taken the cognitive assessment previously and the second abnormal indicator of the user is identified, the cognitive assessment system 100 will execute the step S118 regardless of the first risk value and the second risk value.

In step S118, the computing device 110 responds to the command from the server 130 and executes the advanced task. The advance task can be adopted to estimate different cognitive functions separately and can further examine whether the cognitive impairment of the user is multi-dimensional. For example, the advanced tasks may include (1) anti-saccade task; (2) spatial anticipation task; (3) modified repeated visual search task; (4) reading task; and (5) relational memory task.

Figure 5:
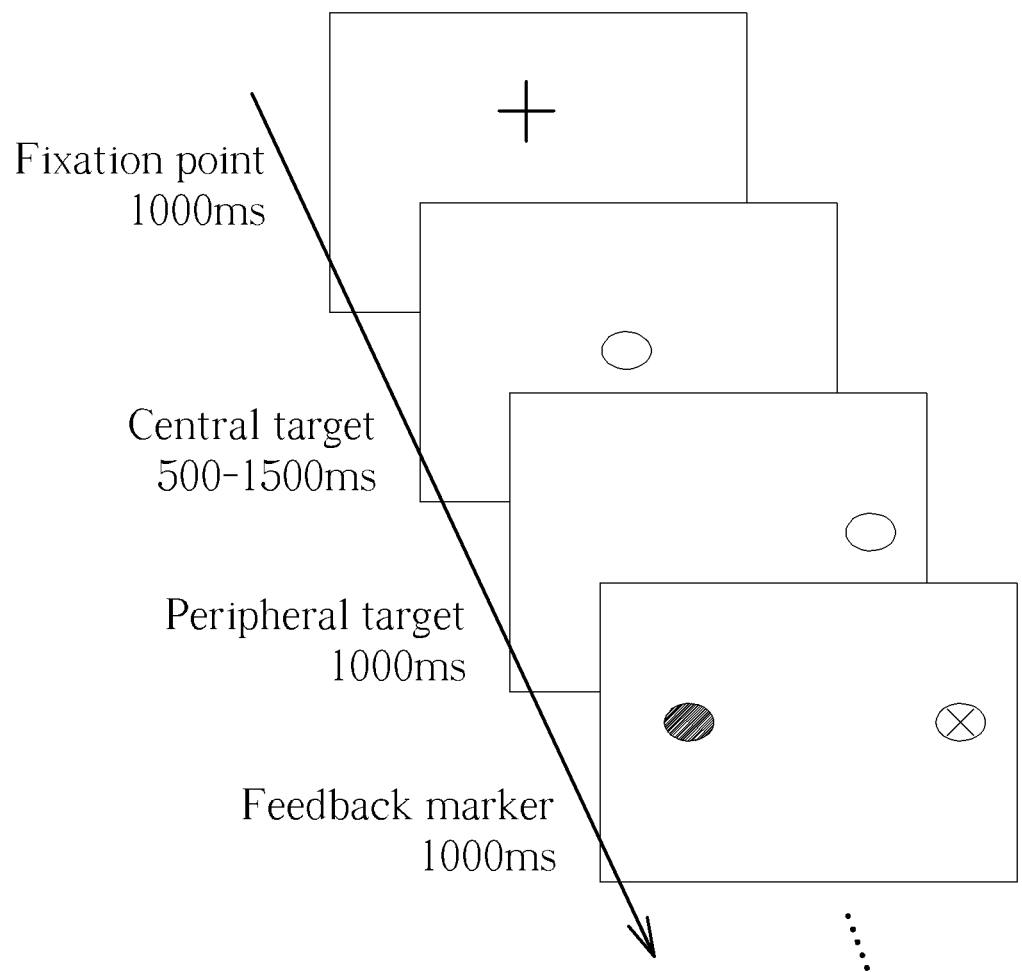
FIG. 5 depicts a diagram of the anti-saccade task of an embodiment.

FIG. 5 is a diagram of the anti-saccade task. The task configuration data includes duration of the fixation point, duration of the central target, duration of the periphery target, duration of feedback, total number of trials, and the position of the periphery target. The task configuration data would be preloaded to the computing device 110 before the task begins. In this task, a fixation point is presented at the center of the screen for a first predefined duration. The fixation point could be a disk, a cross, or other geometric shapes. Then the fixation point is replaced by a central target for a second predefined duration (e.g., 500-1500 ms). The central target can be a disk, bull's-eye, or other geometric shapes, and may be different from the fixation point. Then a periphery target, identical to the central target, is presented at a periphery position for a third predefined duration (e.g., 1000 ms). The periphery position could be any position away from the center of the screen in certain visual angles. For example, the periphery position could be 6° or 12° (visual angle) away from the center of the screen on the horizontal axis. As soon as the peripheral target was presented, the user is asked to saccade to the designated position which is the position that opposites to the peripheral target. After the presentation of the periphery target, the feedback is presented to the user for a fourth predefined duration. The feedback can be a visual marker informing whether the user has fixated correctly on the designated position.

All images disappear from the screen after the presentation of the feedback. The computing device 110 would check whether the number of trials executed has reached a total number of trials. If so, the task ends. If not, the above-mentioned procedures can be repeated.

The computing device 110 can analyze the task information data and the user's gaze-related information data. The task information data includes the timestamp data of the above-mentioned steps (e.g., the onset time of the central target and the onset time of the peripheral target). Then the computing device 110 evaluates the user's task performance data by calculating the spatiotemporal correspondence between the positions of the targets and the user's gaze-related information data. The data for evaluating the task performance data includes: (1) the number and/or proportion of trials that the user correctly looks at the designated position on the screen after the onset of the peripheral target; (2) the number and/or proportion of trials that the user first gazes at the peripheral target and then shifts the gaze to the designated position after the onset of the peripheral target; (3) the number and/or proportion of trials that the user only gazes at the peripheral target and fails to shift the gaze to the designated position before the onset of the feedback; (4) the reaction time between the onset of the peripheral target and the time when the user first gazing at the designated position; (5) the reaction time between the onset time of the peripheral target and the time point where the user shifts the gaze to the designated position after looking at the peripheral target; and (6) the numerical distance between the gaze position and the designated position. The above-mentioned task performance data can also be evaluated by trend analysis of task performance data change as a function of trial numbers.

Figure 6A:
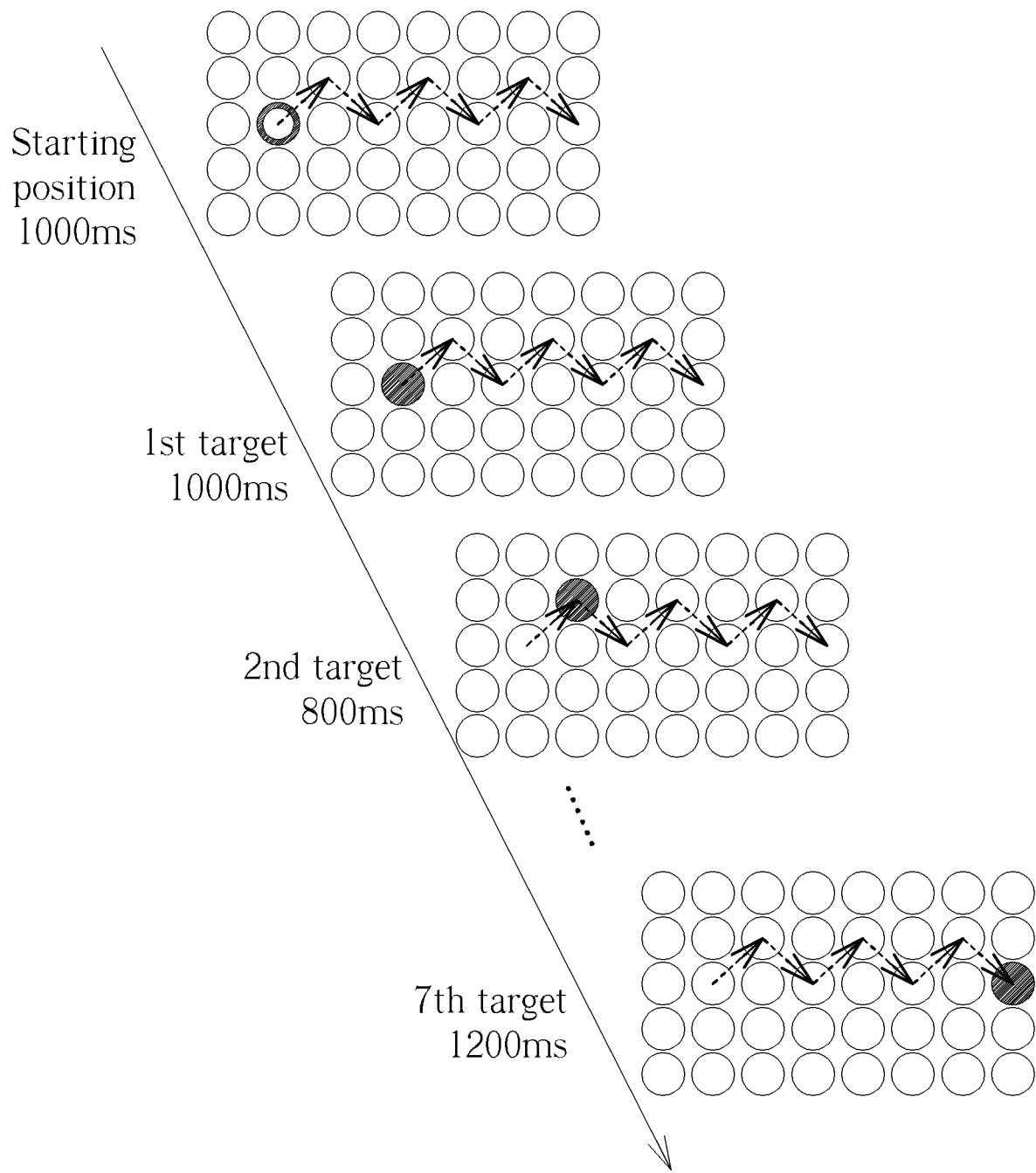
FIG. 6A and FIG. 6B are diagrams of the spatial anticipation task and the moving routes of the target of an embodiment.
Figure 6B:
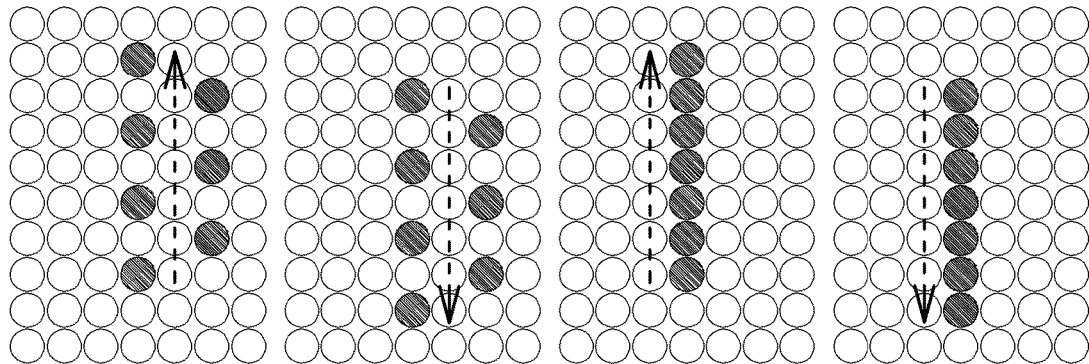
Figure 6B:
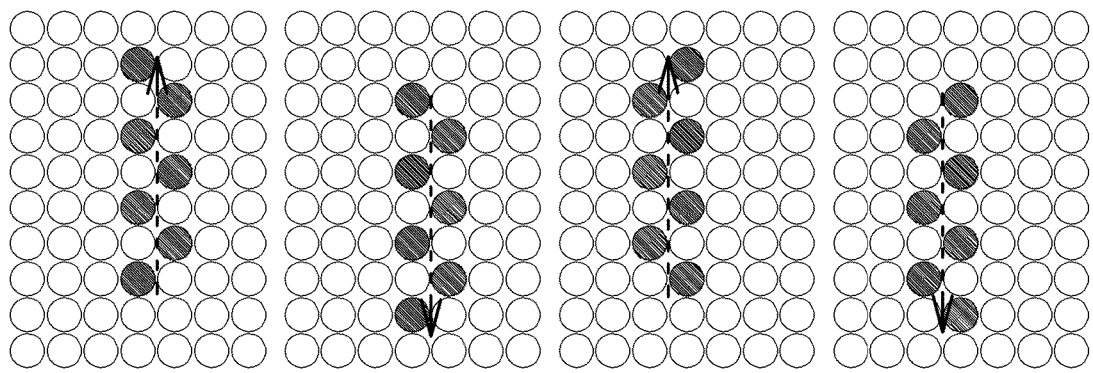
Figure 6B:
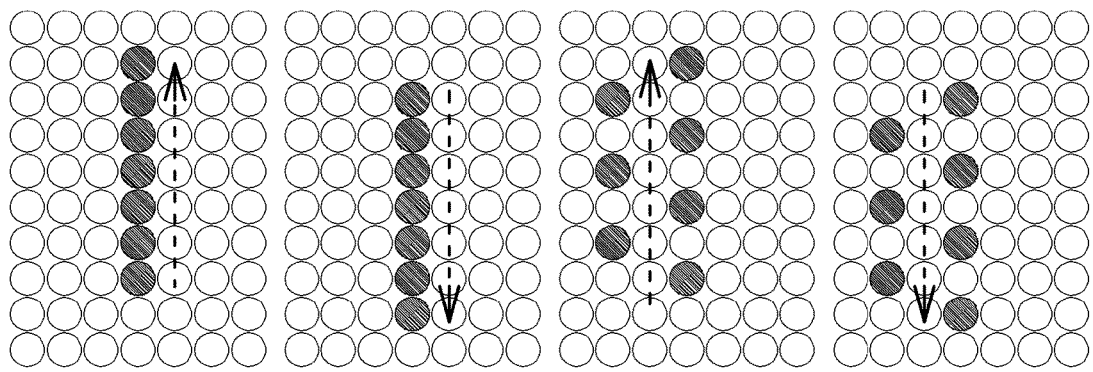

FIGS. 6A and 6B are diagrams of the spatial anticipation task and the moving routes of the target in an embodiment. The task configuration data includes the size of an array of geometric shapes, total number of trials, setup duration of the moving target, the moving routes of a target, and duration of each target position shown within the moving route. The task configuration data is preloaded before the execution of the task. The moving route of the target can include the moving patterns, the length of the moving, and task difficulty determined by the previous two parameters. In this spatial anticipation task, an array of geometric shapes can be shown on the screen.

For example, a 5×8 array of circles is shown in FIG. 6A. For each trial, the computing device 110 can pick a moving route randomly under with a certain number of repetitions of the moving route. At the beginning of each trial, a hollow circle in the array can be chosen as the starting position (e.g., marking the geometric shape). This is to inform the user the initial position of the target and that the trial is about to begin. The marking can last for a certain duration (e.g., 1000 ms), and then the marked hollow circle would be replaced by a target (the solid circle). The solid circle can be shown for certain duration (e.g., 1000 ms). Then, following the preset the moving route, the target is shown at the different position within the array for different duration (e.g., 800 ms-1200 ms). The user is asked to respond to the movement of the target either by using the I/O device 116 or other behavioral response. The trial finishes when the target disappeared in the last position of the moving route. FIG. 6B presents some exemplary moving routes on 7×10 arrays for the spatial anticipation task. However, the present invention is not limited thereto.

When the trial is finished, the computing device 110 can check whether the predefined number of trials has been reached. If so, the task is finished. Otherwise, the above-mentioned procedures will be repeated. The task information data and the user's gaze-related information data are used for calculating the task performance data. The task information data includes: (1) the timestamp of target appeared in each position; and (2) the position of the target shown. The spatiotemporal correspondence between the user's gaze-related information data and the task information data can be utilized together to get the anticipation behavior of the user. In this case, the main anticipation behavior is the anticipated saccades, which is defined as a saccade made to other position of the array before the target moving to the next position. If the anticipated saccade is detected at the next target position, the anticipated saccade is the correct anticipated saccade. Otherwise, it is an incorrect anticipated saccade.

Followings are example task performance data that can be derived from the anticipated saccade to evaluate the cognitive function of the user. The task performance data includes: (1) the number of correct and incorrect anticipated saccades; and (2) proportion of correct and incorrect anticipated saccades. The task performance data can be calculated for each position of the moving route by taking the average across all trials. In addition, the data of each position of the moving route may not be equally important. At least for the first two positions, the user may not yet learn the moving route that the target follows. Thus, in some cases, the user's task performance data can be determined by the anticipated saccade detected at the last few positions in the moving route. Finally, the task performance data can also be calculated and presented as a function of the position in the moving route.

Figure 7B:
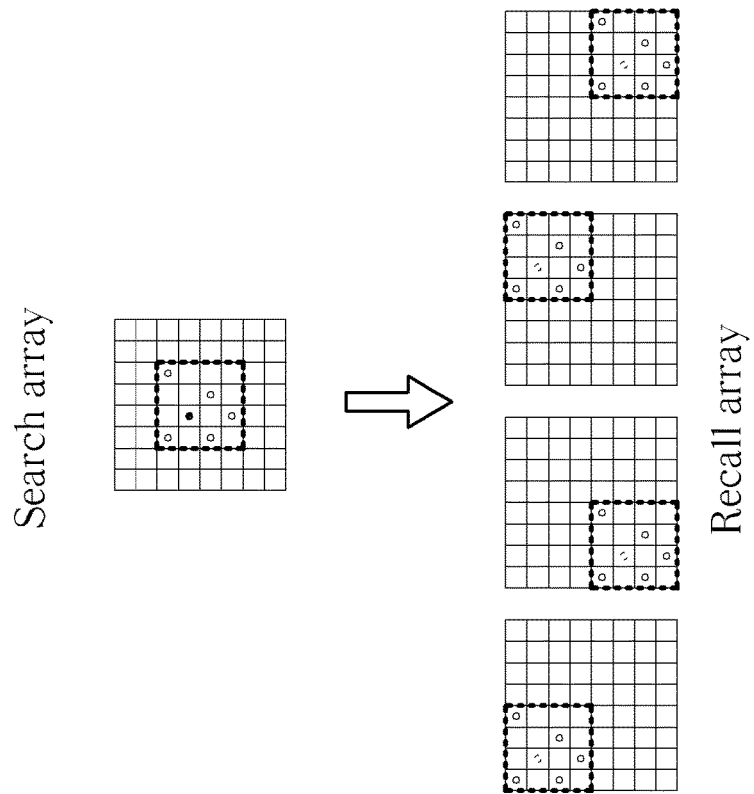
FIG. 7A and FIG. 7B are diagrams of a relational memory task of an embodiment.
Figure 7A:
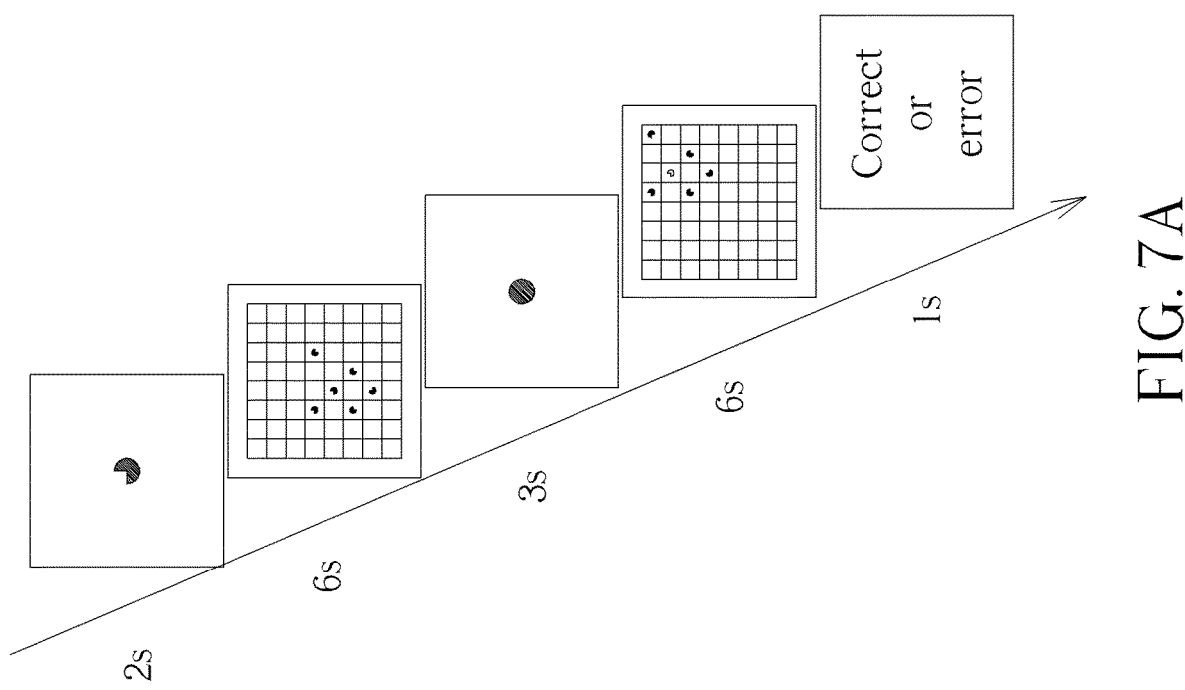

FIGS. 7A and 7B are diagrams of a relational memory task of an embodiment. In the relational memory task, each trial includes (1) a search phase; and (2) a recall phase. The task configuration data includes: (1) the duration of fixation point; (2) the position information of a grid with vertical and horizontal lines; (3) types, numbers, positions of the target and the references in the grid in each trial; (4) setup duration for each trial; (5) the duration of the search phase and recall phase respectively; (6) the number of trials; (7) the time between the search phase and the recall phase; (8) the presentation duration of the feedbacks; (9) the task difficulty for each trial.

In the relational memory task, the target may be a geometric shape and the references are similar to the target but differ in at least one feature such as color, direction, shape, etc. In the beginning of each trial, a target is presented at the center of the screen for a duration of 2 s. Then a search array is presented on the screen for a duration of 6 s. In the search array, the target and multiple references are shown. The positions, the numbers and the similarity of the references are determined from the task configuration data. The user needs to find that target in the search array and fixates on it. The computing device 110 can determine whether the user has successfully fixated on the target and respond accordingly. Next, a fixation point will be shown for a duration of 3 s (as shown in the FIG. 7A) or longer (e.g., 6 s). The fixation point could be geometric shapes such as a disk or a cross. The geometric shape of the fixation point can be different from the geometric shapes of the target and the references.

Next, the trial will enter the recall phase. A recall array will be shown for a duration of 6 s. In the recall phase, the same grid in the memory phase is presented, but only the references are shown and the positions of the references are shifted. By doing so, the absolute positions of the references in the grid would be changed while the relative positions between them are kept consistent. The user needs to find the correct relative position of the target in the grid (e.g., the hollow shape and the dash line shape in FIGS. 7A and 7B respectively). If the user has successfully fixated on the relative position of the target, the computing device 110 can determine the user is correct. After the recall phase (e.g., 6 s), the feedback will be shown to inform the user's task performance. The feedback can be visual messages or audio messages. Similar to the above-mentioned tasks, at the end of each trial, the computing device 110 can check whether the predefined number of trials has been reached. If so, the task is finished and the user's task performance data is evaluated by analyzing the spatiotemporal correspondence between the task information data and the gaze-related information data. Otherwise, the trial can be repeated. Please note that the lengths of time are mere examples, and the present invention is not limited thereto.

In addition, FIG. 7B shows an exemplary search array for the search phase and a few exemplary recall arrays for recall phase corresponding to the search array. In the upper portion of FIG. 7B, the black dot indicates the position the target where the user should fixate at during the search phase. In the bottom portion of FIG. 7B, the dash line circle indicates the relative position of the target where the user should fixate at during the recall phase. These arrays are mere examples. In other embodiment, the target and the references can also be a grating pattern such as the Gabor patch. The present invention is not limited thereto.

Followings are examples of the task performance data for the task performance evaluation. The task performance data includes: (1) the number and/or proportion of correct response in the search phase; (2) the reaction time to fixate on the target in the search phase; (3) the number of fixations needed to get the correct response in the search phase;(4) the proportion of time that the user fixated on the target, the references, and other positions in the grid in the search phase; (5) the number of fixations on the target, the references, and other positions in the grid in the search phase; (6) the number and/or proportion of correct response in the recall phase; (7) the reaction time to find the relative position of the target in the recall stage; (8) the number of fixations needed to get the correct response in the recall stage; (9) the number and/or proportion of fixations on the relative position of the target, the references, and other positions in the recall phase; (10) the length of time that the user fixated on the relative position of the target, the references, and other positions in the recall phase. All these task performance data could be further grouped by task difficulty. Comparisons on the task performance data in different groups can also be performed.

The task difficulty of each trial is related to the similarity of the feature of the target and the references. These features include orientation, shape, and color. For example, the target and the references could be disks with grating patterns. The grating patterns on the disk could have different orientations. The similarity between a 0° target and a 10° reference is higher than that between a 0° target and a 15° reference. Also, the task difficulty is positively correlated with the time between the search phase and the recall phase.

Figure 8:
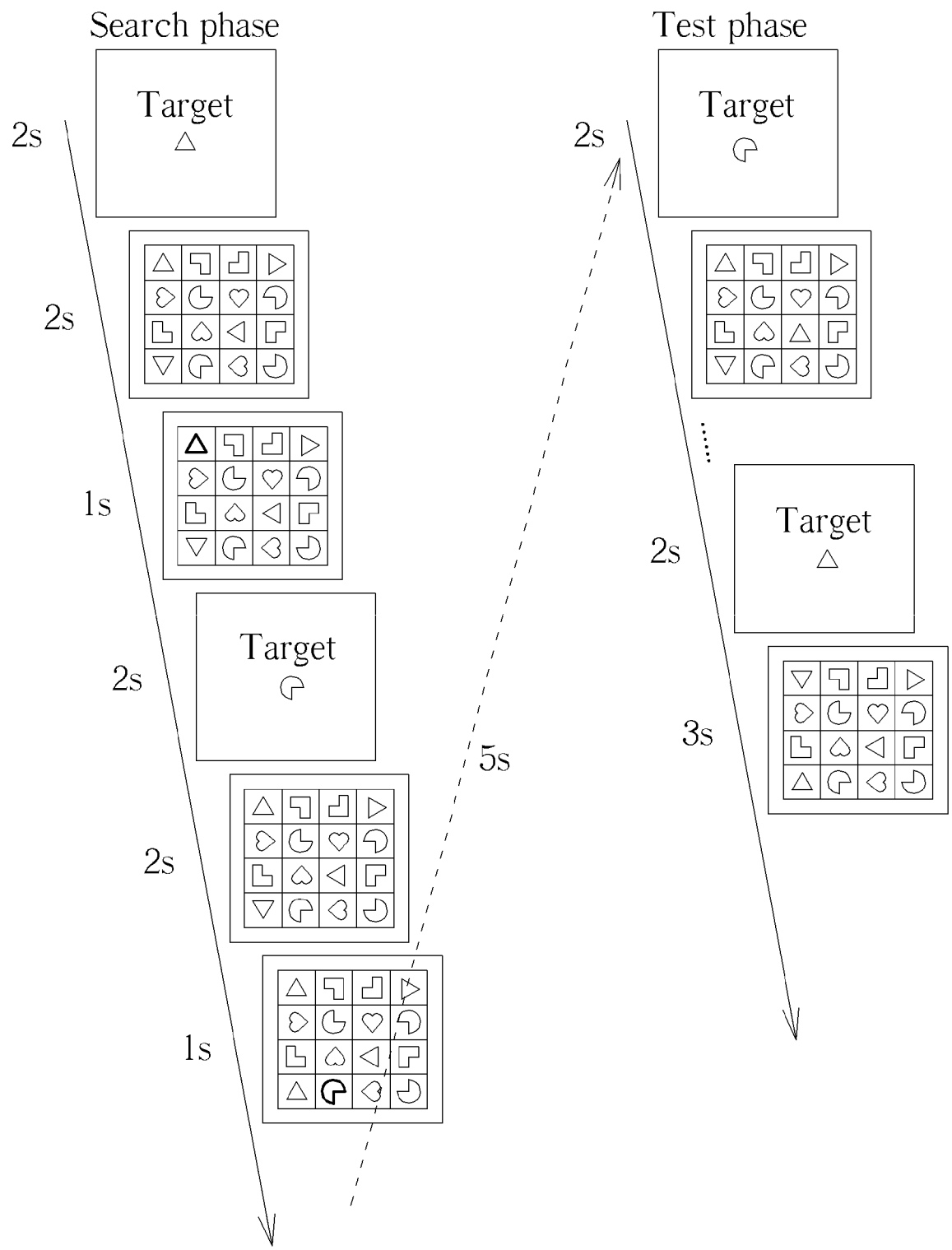
FIG. 8 is a diagram of a visual search task of another embodiment.

FIG. 8 is a diagram of a visual search task of another embodiment. The task configuration data is also preloaded before the execution of the task. The task configuration data includes: (1) the setup time to confirm the target; (2) the duration of the search phase and the test phase respectively; (3) the duration of the feedback; (4) the time between the search phase and the test phase; (5) the number of trials in the search phase and the test phase, (6) a list describing the target in the search phase and the test phase, (7) a contextual list regarding the test condition in the test phase; (8) an array with of vertical and horizontal lines to display visual objects in each phase; (9) types of visual objects shown in the array; (10) positions of the visual objects in the array. The visual objects used in the relational memory task could be geometric shapes or pictures, etc. It can also be geometric shapes with different degree of rotation.

When the search phase begins, a target (e.g., a triangle) is shown to inform the user what to search for. Then the search array is shown on the screen for a duration of 2 s. The user needs to search the target during this search time. After the search time is up, the target in the array will be marked with a different color or a bold frame for feedback. After the trial, the computing device 110 can check whether the predefined number of trials has been reached. If not, the above-mentioned procedures can be repeated. Otherwise, after a predefined time, the trial enters the test phase. The procedure of the test phase is similar to that of the search phase except that in the test phase, according to the contextual list, in a portion of trials the computing device 100 can randomly change the place of the target with one of the non-target objects on the search array (e.g., one of the three objects that share the same shape with the target but with different degree of rotation as shown in FIG. 8), and no feedback is given to the user.

After the task has finished, the computing device 110 can evaluate the user's task performance by analyzing the task information data and the gaze-related information data of the user. The task information data includes the timestamp of each step and the position of the objects during each step. The task performance data includes: (1) the proportion of time that the user fixated on the target and the non-target object and (2) the number of fixations on the target and the non-target object in the test phase. The task performance data can also be grouped based on (1) the condition in the test phase determined by the contextual list or (2) the time between the trial where a specific object is searched in the search phase and the trial where the same object is searched in the test phase.

After the advanced task is completed in step 118, in step S120, the computing device 110 transfers the advanced task performance data of the user to the server 130. In step S122, the server 130 compares the advanced task performance data of the user with the advanced task performance data in the database to generate the second comparison result. In step S124, the server 130 calculates a second risk value according to the second comparison result. In an embodiment, to calculate the second risk value, the server 130 first selects a population in the database that corresponds to the user's background information (e.g., age, gender, education background), and compares the user's advanced task performance data to a set of data. The set of data includes the historical task performance data of the user, the task performance data of a healthy population and/or a patient population (e.g., subjective cognitive decline, mild cognitive impairment, Alzheimer's disease and other types of disease involved cognitive impairment).

In addition, the task performance data includes the distribution of the absolute and the relative task performance of the population, and an individual's trend and pattern of relative task performance across several cognitive assessments. The historical task performance model can be constructed for at least on a set of data collected (i.e., the data of the user, the healthy population and/or the patient population) based on the relative task performance across several cognitive assessments. In other embodiment, the task performance data also includes the absolute task performance across several cognitive assessments, and the historical task performance can be constructed based on such absolute task performance data. The second comparison result can include the user's rank in a given population, and the probability of the user can be categorized to a given population. The probability of a given user categorized as a given population can be calculated based on the goodness-of-fit between the relative task performance of the user across several cognitive assessments and the historical task performance model of healthy population and/or the patient population. The goodness-of-fit may be implemented in the form of probability, root mean square error (RMSE) or any other statistic method that can estimate the discrepancy between the observed data and a historical task performance model.

To calculate the second risk value, the server 130 can further calculate a local risk value for each task according to the methods described in step S112, and then calculate the second risk value based on all local risk values. The second risk value can be an average of all local risk values each weighted by a specific constant. The constant can be defined by the sensitivity, the specificity, the area under receiver operating characteristic curve (AOC), and/or the accuracy of each task. These constants are used to discriminate the patient population from the healthy population. In other embodiment, the server can further adopt the first comparison results to calculate the local risk value and the second risk value. In other embodiments, to calculate the second risk value, the server 130 can form a discrimination model constructed by both the basic and the advanced task performance data to discriminate the patient population from the healthy population. The above-mentioned task performance data includes the task performance data in a single test and the task performance data across consecutive tests. In such case, the second risk value can be the Euclidean distance between the user's overall task performance and the threshold value defined by the discrimination model in a given Euclidean space.

More specifically, the discrimination model may estimate the performance of the user as a position in a geometric space. Each task performance data can construct a dimension of the space. In some cases, a statistic method (i.e., factor analysis and primary component analysis) can be used to extract the main factors affecting the task performance data. In such cases, the number of dimensions of the space can be further reduced to the number of the main factors. The threshold value can be a point, a line, or a plane in the space according to the number of dimensions of the space. The numerical distance between the user's task performance data and the threshold value can be defined as the Euclidean distance. A cumulative distribution function can be used to estimate the risk value. In such a function, the x axis is the Euclidean distance, and the y axis is the probability of categorizing a user as a given population. The estimated risk value corresponds to the probability at a given numerical distance.

After obtaining the second risk value in step S124, the server 130 determines whether the second risk value is larger than a second threshold. If the second risk value is larger than the second threshold, the server 130 can generate the second abnormal indicator.

In step S130, the cognitive assessment system 100 can generate a cognitive assessment report to the user. The cognitive assessment report can include: (1) a score, a chart, and/or a symbol indicating the user's task performance relative to the healthy population with respect to the user's background information; (2) a risk value indicating the probability that the user would develop a certain cognitive impairment; and (3) advice regarding daily activities to the user for reducing the risk of developing the cognitive disease.

The server 130 can further determine when the user should take the cognitive assessment program again according to the user's task performance data and the distribution of the first abnormal indicator and the second abnormal indicator. If the first abnormal indicator and/or second abnormal indicator are generated by the cognitive assessment system 100, the user should take the cognitive assessment program again within a short time (e.g., a week). Otherwise, the user can take the cognitive assessment program again in a longer time (e.g., in six month). In this case, the server 130 can further connect with the user's personal calendar (e.g., Google Calendar) and schedule the cognitive assessment.

In another embodiment, the computing device 110 can alert the user according to the first and/or second abnormal indicators. If first and/or second abnormal indicators are present frequently across several consecutive assessments, the computing system 110 can determine that the cognitive function of the user is declining and would alert the user to get medical advice.

In another embodiment, the server 130 of the cognitive assessment system 100 may be connected with a medical platform and/or a medical institution. In such case, the cognitive assessment report and the alert can be sent to the medical platform and/or the medical institution to be reviewed by medical professionals.

The basic task and advanced task can also be modified according to the application. For instance, if the impairment of memory function is critical for a specific application, the basic task can include a task evaluating the memory function. In other cases, if the key factor of an application is to determine whether a user is suffering from a multidimensional cognitive impairment, the basic task can include a subtask assessing the memory function and the other subtask assessing the executive function. Moreover, if the basic task revealed an impairment of a specific cognitive function, such as the executive function, the cognitive assessment system 100 can take this into consideration and select the advanced tasks that assess the status of the executive function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cognitive assessment system, comprising:
 a computing device comprising a processor configured to execute a cognitive assessment program with at least one cognitive assessment task for assessing at least one cognitive function of a user;
 a server coupled to the computing device, comprising:
  a database storing a historical task performance data of the user, a historical task performance model of the user, task performance data of a healthy population, and task performance data of a patient population; and
  a processor configured to:
   receive the task performance data of the user from the computing device;
   compare the task performance data of the user and the historical task performance data of the user to the task performance data of the healthy population and the task performance data of the patient population to generate a comparison result;
   generate a risk value according to the comparison result; and
   generate a cognitive assessment report according to the risk value and the comparison result;
 an eye tracking device coupled to the computing device, configured to capture the eye movement data of the user;
 wherein
 the task performance data of the user comprises the eye movement data.

2. The cognitive assessment system of claim 1, wherein the at least one cognitive assessment task comprises a basic task and an advanced task.

3. The cognitive assessment system of claim 2, wherein the basic task is for assessing a plurality of cognitive functions.

4. The cognitive assessment system of claim 2, wherein the advanced task includes a plurality of cognitive assessment tasks which are configured to assess a specific cognitive function, and the processor of the computing device is further configured to selects at least one advance task according to task performance data of the basic task.

5. The cognitive assessment system of claim 1, wherein the historical task performance model of the user is generated from the historical task performance data of the user.

6. The cognitive assessment system of claim 1, wherein the database further comprises a historical task performance model of a healthy population and a historical task performance model of a patient population.

7. The cognitive assessment system of claim 6, wherein:
 the comparison result comprises a rank of the task performance of the user; and a probability of the user is categorized to a certain population in the database;

wherein: the probability of the user being categorized to a certain population in the database is determined by the goodness-of-fit between historical task performance data of the user and the historical task performance model of each population in the database.

8. The cognitive assessment system of claim 7, wherein the processor of the server is further configured to implement a discrimination model for discriminating the patient population from the healthy population according to the comparison result.

9. The cognitive assessment system of claim 8, wherein the risk value is determined by a numerical distance between the task performance data of the user and a threshold value defined by the discrimination model.

10. The cognitive assessment system of claim 9, wherein the patient population is a group of individuals with cognitive impairment.

11. The cognitive assessment system of claim 1, wherein the cognitive assessment report comprises:
a score, a chart and/or a symbol indicating the task performance of the user relative to the healthy population with respect to background information of the user;
a risk value indicating a probability of developing a cognitive disease; and
an advice regarding daily activities to the user for reducing the risk of developing the cognitive disease.

12. The cognitive assessment system of claim 11, wherein if the risk value is larger than a threshold, the processor of the server generates an abnormal indicator.

13. The cognitive assessment system of claim 12, wherein the processor of the server is further configured to schedules a next cognitive assessment for the user according to the abnormal indicator.

14. The cognitive assessment system of claim 12, wherein if a frequency of the abnormal indicator generated is higher than another threshold, the processor of the server sends an alert to the user regarding cognitive decline according to the abnormal indicator.

15. The cognitive assessment system of claim 14, wherein the processor of the server is configured to determine the cognitive decline, and include medical advice in the cognitive assessment report.

16. The cognitive assessment system of claim 15, wherein the server is a cloud server.

17. The cognitive assessment system of claim 16, wherein the server is connected with a medical platform and/or a medical institution.

18. The cognitive assessment system of claim 17, wherein the processor of the server is further configured to send the cognitive assessment report and an alert to the medical platform and/or the medical institution to review the report.

19. The cognitive assessment system of claim 1, wherein the eye movement data comprises gaze position, pupil size, and blink information.

* * * * *